(12) United States Patent
Norlén et al.

(10) Patent No.: US 8,457,023 B2
(45) Date of Patent: Jun. 4, 2013

(54) METHOD FOR SELECTING OPERATING FREQUENCY CHANNELS IN A WIRELESS COMMUNICATION SYSTEM

(75) Inventors: Niclas Norlén, Uddevalla (SE); Per Hulthén, Göteborg (SE)

(73) Assignee: LumenRadio AB, Göteborg (SE)

( * ) Notice: Subject to any disclaimer, the term of this patent is extended or adjusted under 35 U.S.C. 154(b) by 117 days.

(21) Appl. No.: 13/259,335

(22) PCT Filed: Mar. 30, 2010

(86) PCT No.: PCT/EP2010/054159
§ 371 (c)(1),
(2), (4) Date: Sep. 23, 2011

(87) PCT Pub. No.: WO2010/112483
PCT Pub. Date: Oct. 7, 2010

(65) Prior Publication Data
US 2012/0069806 A1    Mar. 22, 2012

Related U.S. Application Data

(60) Provisional application No. 61/164,553, filed on Mar. 30, 2009.

(30) Foreign Application Priority Data

Mar. 30, 2009  (SE) ...................................... 0950198

(51) Int. Cl.
*H04W 72/08*    (2009.01)
*H04J 1/00*    (2006.01)
*H04B 7/208*    (2006.01)
*H04B 17/00*    (2006.01)

(52) U.S. Cl.
USPC ........... 370/281; 370/330; 370/344; 370/437; 370/480; 455/450; 455/67.13

(58) Field of Classification Search
None
See application file for complete search history.

(56) References Cited

U.S. PATENT DOCUMENTS 5,898,928 A * 4/1999 Karlsson et al. .............. 455/450
6,298,081 B1 * 10/2001 Almgren et al. .............. 375/132
(Continued)

FOREIGN PATENT DOCUMENTS

| EP | 1137299 A2 | 9/2001 |
| WO | 2005006584 A2 | 1/2005 |
| WO | 2007009043 A1 | 1/2007 |

OTHER PUBLICATIONS

"Interference Mitigation Using Spectrum Sensing", by S. Srikanteswara et al., Computer Communications and Networks, 2007 IEEE, pp. 39-44.

*Primary Examiner* — Candal Elpenord
(74) *Attorney, Agent, or Firm* — Capitol City TechLaw

(57) ABSTRACT

The present invention relates to a method for selecting operating frequency channels having frequency parameters, such as a frequency interval or at least one carrier frequency, for a network communicating data over a shared medium. The network is configured to communicate within a frequency range, and the frequency range is divided into a plurality of frequency channels $f_1$-$f_n$, each frequency channel defines a predetermined frequency parameter. The data to be communicated over the network is divided into sequences FS, each sequence having a plurality of positions $SP_1$-$SP_m$. The method further comprises regularly scanning the frequency range to identify interfering frequencies generated by interfering networks operating within said shared medium, and assigning a frequency channel $f_k$ to each position $SP_j$ within the sequences FS based on the identified interfering frequencies, whereby the use of interfering frequencies is limited.

14 Claims, 4 Drawing Sheets

U.S. PATENT DOCUMENTS

| | | | |
|---|---|---|---|
| 6,490,262 B1 * | 12/2002 | Hogger | 370/337 |
| 7,054,301 B1 * | 5/2006 | Sousa et al. | 370/343 |
| 7,092,428 B2 * | 8/2006 | Chen et al. | 375/132 |
| 7,103,030 B2 * | 9/2006 | Jones | 370/343 |
| 7,701,913 B2 * | 4/2010 | Chen et al. | 370/338 |
| 7,773,660 B2 * | 8/2010 | Schmandt et al. | 375/135 |
| 8,126,488 B2 * | 2/2012 | Albert et al. | 455/502 |
| 8,213,345 B2 * | 7/2012 | Suo et al. | 370/280 |
| 8,351,949 B2 * | 1/2013 | Fu | 455/450 |
| 2004/0092256 A1 * | 5/2004 | Keller et al. | 455/422.1 |
| 2008/0130573 A1 | 6/2008 | Lee et al. | |

* cited by examiner

METHOD FOR SELECTING OPERATING FREQUENCY CHANNELS IN A WIRELESS COMMUNICATION SYSTEM

CROSS REFERENCE TO RELATED APPLICATIONS

This application claims the benefit under 35 USC 119(e) to U.S. Provisional Patent Application No. 61/164,553 filed on Mar. 30, 2009.

TECHNICAL FIELD

The present invention relates to a method for selecting operating frequency channel for a wireless network when communicating data. The invention also relates to a wireless network.

BACKGROUND

The task to create networks in environments where many wireless networks are simultaneously operating has always been a challenge. Such environments are typically found in urban and industrial areas. Interference from other wireless devices will vary over time due to the fact that some wireless networks are used more at certain hours of the day, and others new wireless networks may also be installed. An example of this is WiFi usage in a residential area which is often used more heavily during the evenings and weekends.

The prior art technique for interference free coverage in wireless networks is to only allow signals within a frequency interval for a specific wireless network, which often requires a governmental license, as illustrated in FIG. 1. Examples of such networks are GSM and television broadcasting, see for instance EN 301 511, Global System for Mobile communications (GSM).

If a network is expanded to cover a large area where a number of WiFi networks and other wireless networks are operating, the problem with interference arises. The use of the same communication parameters, such as frequency, in the different networks may result in disrupted communication. Although the WiFi hotspots are out of range of each other, they are within the coverage area of the expanded large area network. It should be noted that not only the expanded large area network may be disrupted due to the interference between the networks, but most certainly the local WiFi networks will be disrupted resulting in a lower quality of service for the WiFi hotspots.

A typical example is a multi-storey office building having a WiFi network on each and every floor. Sometimes many local WiFi areas may be found on the same floor. The sum of all frequencies used within the entire building, which may be considered to be a large area network, results in a loss of available frequencies to use. This may result in communication drop outs. In addition to this, other wireless more mobile devices, such as wireless headsets, may be frequently used within the multi-storey building further increasing the density temporarily. Wireless headsets generally operate using Bluetooth 2.0, using an adaptive frequency selection algorithm that only tries to find a method to optimize its own data throughput sometimes at a cost of other networks throughput.

Thus, a general drawback with prior art wireless networks is that the risk for interference between different wireless networks increases when they operate within the same coverage area using frequencies close to each other. This drawback applies to any network using a shared medium, such as a fiber network.

A solution has been presented in WO 2007/009043, reference [1] describing a method to selecting communication channels in order to reduce the interference in a communication system, by adaptive frequency hopping or background monitoring to identify incumbent users.

Another solution has been presented in an article with the title "Interference Mitigation Using Spectrum Sensing", reference [2] describing a method to reduce interference by spectrum detection, by detecting interfering networks and adapting communication parameters in response thereto.

A drawback with the solutions to reduce the interference when communicating in a communication network is that the information communicated during a time slot uses a dedicated frequency channel and in order to prevent interference, the used frequency channel needs to be free from interferences of other networks. This will reduce the number of available frequency channels that could be used for communication.

SUMMARY OF THE INVENTION

An object with the present invention is to provide a method for increasing coexistence with a reduced risk for interference between networks communicating data over a shared medium compared to prior art networks.

This object is achieved by a method for selecting operating frequency channels for a network configured to communicate within a frequency range and communicating data over a shared medium. The method comprises dividing the frequency range into a plurality of frequency channels, each frequency channel defines a predetermined frequency interval or at least one carrier frequency; and dividing data to be communicated over the network into sequences, each sequence having a plurality of positions. By regularly identifying interfering frequencies generated by interfering networks operating within the shared medium, a frequency channel is assigned to each position within a sequence based on the identified interfering frequencies.

An advantage with the present invention is that the communication density for networks using a shared medium, such as wireless networks or fiber networks, increases compared to prior art methods.

Another advantage with the present invention is that interference between networks may be reduced compared to prior art methods.

Still another advantage is that lower energy consumption may be achieved since retransmissions of lost data packets due to interference is reduced compared to prior art networks.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

In the following, wireless networks are described to exemplify the inventive concept. However, any type of network communicating data over a shared medium, such as fiber networks, may benefit from the frequency selection method described herein.

Figure 1:
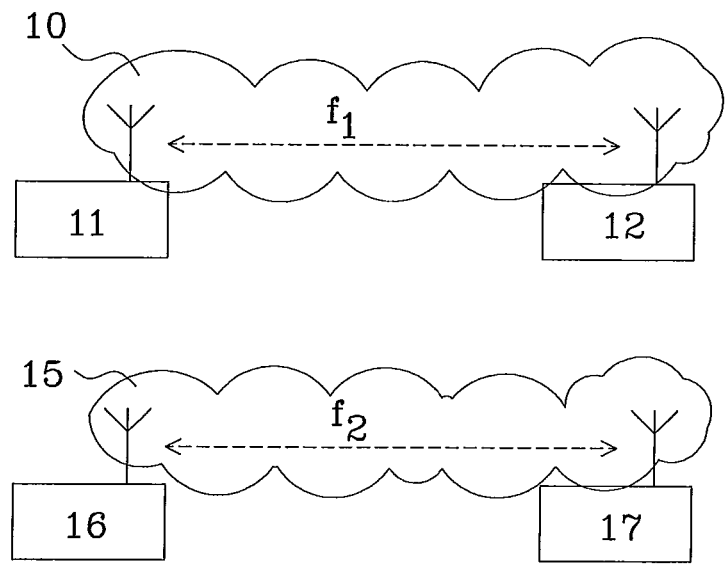
FIG. 1 shows two wireless networks that operate without interference according to prior art.

FIG. 1 shows two wireless networks 10, 15 operating in the same environment. A first communication device 11 communicates over a first wireless network 10 with a second communication device 12 using a first frequency range, illustrated by $f_1$ (e.g. 5-10 MHz). A third communication device 16 communicates over a second wireless network 15 with a fourth communication device 17 using a second frequency range, illustrated by $f_2$ (e.g. 15-20 MHz). Interference between the first network 10 and the second network 15 is prevented by using non-overlapping operating frequency ranges for the wireless networks.

It is of course more common that overlapping frequency ranges are used for the wireless networks 10 and 15. When shared frequency ranges are used, data communication of the second network 15, sharing the same medium as the first network 10, has not been taken under consideration to maximize the data throughput of the first network 10 according to prior art.

A fundamental disadvantage with prior art technologies is that they are inefficient in using the available frequency resources. Another disadvantage is that prior art technologies with overlapping operating frequency bands, i.e. share the same communication frequencies, will need to retransmit data every time a data transmission fails due to interference, thus increasing power consumption as well as limiting the data throughput.

Thus, there is a need to provide a method that automatically and regularly (i.e. more or less continuously) adapts the use of individual frequencies so that other networks, sharing the same medium, avoid communicating in the same frequency band. Furthermore, it is desired that the method is easily implemented.

The present invention will reduce, and in some cases even prevent, interference to other networks thus making communication within a predetermined frequency range (e.g. 2.4-2.4835 GHz) more efficient for coexisting networks sharing the same medium, i.e. within fiber networks or wireless networks with overlapping coverage area. Further the invention will increase the communication density within the medium thus allowing a more efficient use of frequency resource.

Figure 2:
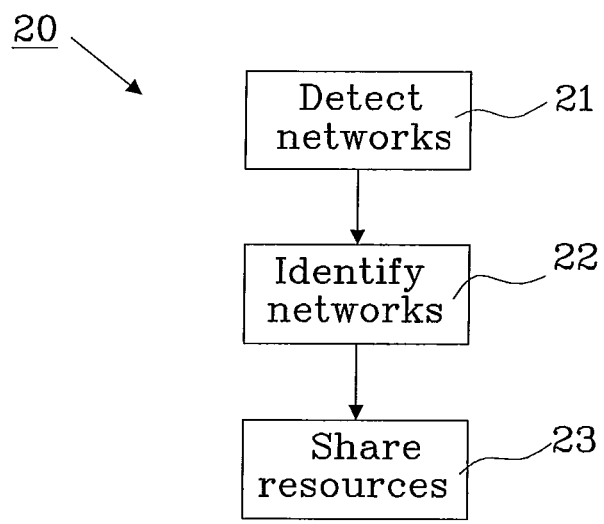
FIG. 2 shows a flow chart of a method for increasing communication density according to the present invention.

FIG. 2 shows a flow chart of a method 20 for increasing communication density for a network communicating data over a shared medium. The method comprises three subsequent steps: detect networks 21, identify networks 22 and share resources 23.

Detect Networks

In order to be able to select suitable frequency channels within an operating frequency range for a specific network communicating data over a shared medium, it is essential to detect interfering networks sharing the medium and occupying frequency resources within the operating frequency range of the specific network. The detection is preferably performed by scanning the frequencies in the operating frequency range and thereafter detecting the type of interfering network(s), such as a stationary network (communicating over a stationary frequency band) or a non-stationary network (i.e. frequency hopping network).

Identify Networks

When the type of interfering network has been identified, an attempt is made to identify the network, as described in more detail below. In case the attempt is unsuccessful, default values for stationary and non-stationary networks are preferably used to minimize interference.

Figure 4:
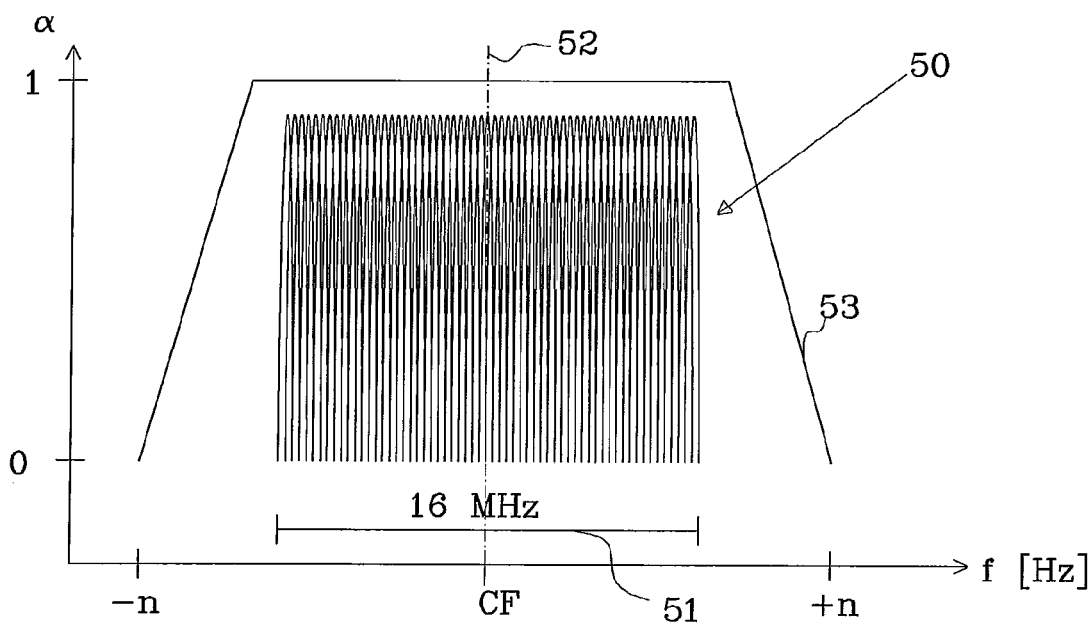
FIG. 4 shows an example of how a detected wireless network influences the established frequency matrix.

Each type of identified stationary network has its own frequency values that may be stored in a database and retrieved when sharing resources. For instance, a type of stationary network is shown in FIG. 4, which is used for 802.11g WiFi networks. A detected use of a frequency within the illustrated 16 MHz band will also generate a quarantine time for the complete 16 MHz band (and possibly neighbouring frequencies) before it may be established that the interfering network is no longer occupying the frequency interval [−n, +n] as indicated in FIG. 4.

Each type of identified non-stationary network has a frequency pattern, e.g. used frequencies, order of frequency use, etc.

Share Resources

Information regarding the frequency range of the specific network, i.e. available frequencies for data communication, is stored in a memory (database) that is accessible in the network together with information regarding frequencies used by interfering networks and optionally quarantine time for previously used frequencies. Based on the information, which is retrieved from the database, frequency channels are selected for subsequent data communication that minimizes the risk for, or even prevents, interference from other networks communicating data over the shared medium.

Figure 3:
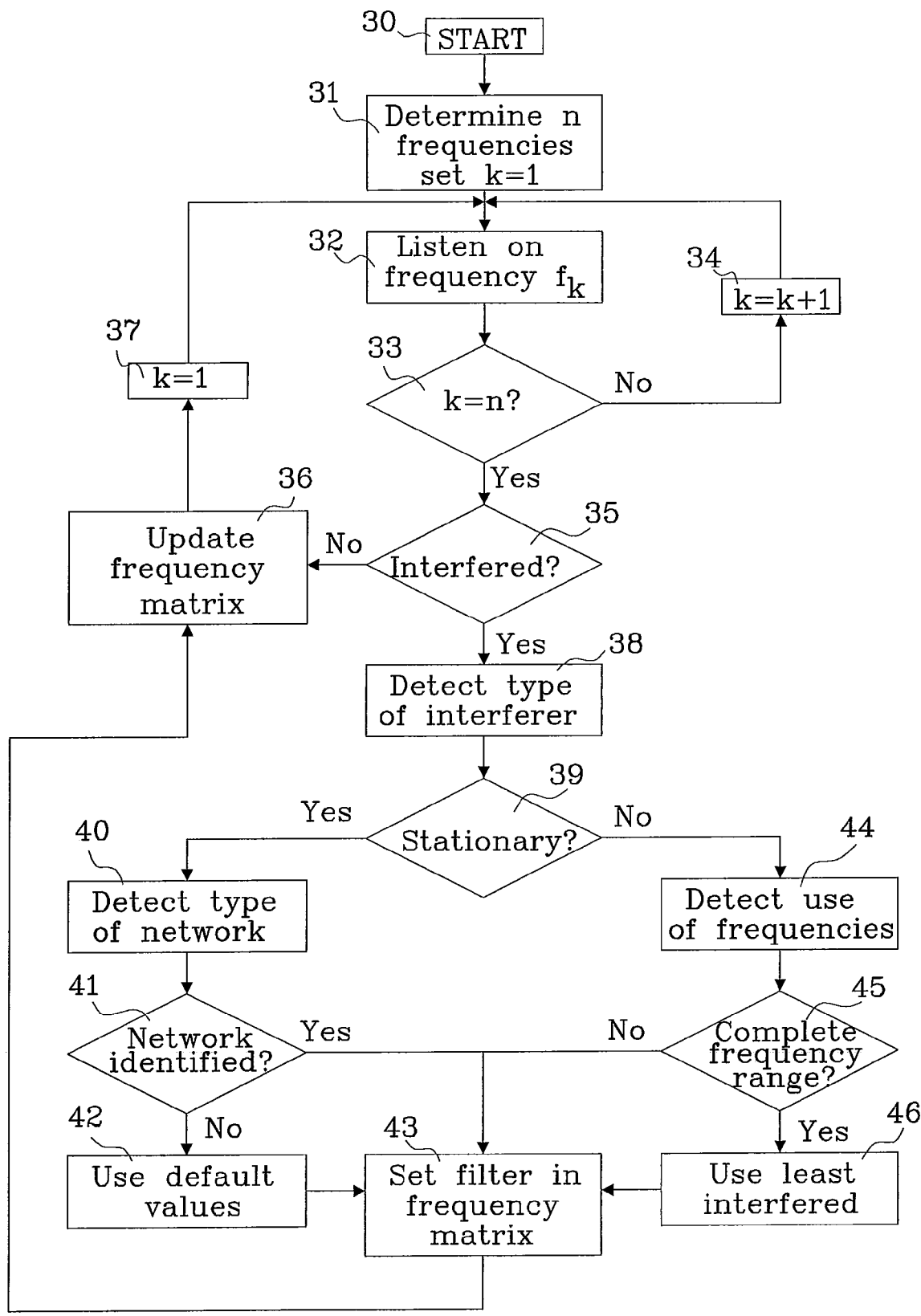
FIG. 3 shows a flow chart of a method for establishing a frequency matrix used when sharing frequency resources according to the present invention.

FIG. 3 shows a more detailed flow chart of a method for establishing a database model in the shape of a frequency matrix used when sharing frequency resources according to the present invention.

The flow starts at step 30, and the basic structure of a frequency matrix is established in step 31 by setting certain frequency parameters, e.g. the available frequency range for the network, and number of discrete frequencies "n" to be scanned. An integer "k" is also set to one, k=1.

The flow continues to step 32, in which frequency "$f_k$" is scanned to detect usage by listening on the frequency. The result of the scanning is stored in a memory for further processing. In step 33 the integer "k" is compared with "n". If k<n, the flow is fed back to step 32 via step 34 in which the integer "k" is increased by one, k=k+1, before step 32 is repeated and the next discrete frequency "$f_k$" is scanned.

If k=n in step 33, the flow continues to step 35 in which the stored results from the scanning procedure performed in step 32 for all discrete frequencies "n" are analyzed. If no interfering data communication has been detected, the flow continues to step 36 and the content of the frequency matrix is updated to reflect the result of the performed analysis in step 35. The procedure to update the frequency matrix is described in more detail below.

From step 36, the flow is fed back to step 32 via step 37, in which the integer "k" is reset to one, k=1, before a new scanning procedure of all discrete frequencies "n" commences, i.e. steps 32-35.

However, if any type of interfering data communication has been detected within the frequency range defined in the frequency matrix, the flow continues from step 35 to step 38.

In step 38, adjacent frequencies of each frequency with a detected interference are measured during a period of time to determine if the interfering network is of stationary type or non-stationary type (frequency hopping).

The type of inferring network is determined in step 39. If the interference is found in a limited bandwidth and the interference is continuously/constantly detected spread over the limited bandwidth it is said to be stationary and the flow continues to step 40. On the other hand if the interference is found on discrete frequencies in a limited bandwidth it is said to be frequency hopping and the flow continues to step 44.

In step 40, the type of stationary interference network is detected using a database of known behaviour of different types of stationary networks. If detection fails, step 41, the network is determined to be an unknown stationary network and default values describing the impact of the available frequencies in the frequency matrix is selected, step 42. Frequency filter parameters, such as frequencies to be avoided, quarantine times, etc., are set in step 43.

However, if the type of stationary network can be determined, the flow continues from step 41 directly to step 43, in which particular values associated with the determined stationary network are used to set the frequency filter parameters.

In step 44, the extent of frequencies used by interfering frequency hopping network is detected. The overall aim is to set a frequency sharing rule. The frequency sharing rule will be used to set the usage rate of the interfered frequencies. A frequency hopping interfering data communication signal will not always need to be completely avoided as collisions on a particular frequency will seldom be likely to happen.

If a detected frequency hopping network is using the entire bandwidth (which is likely in the majority of frequency hopping networks), as determined in step 45, the least interfered frequencies will be used more in favour of those where more interference is detected. The least interfered frequencies are identified in step 46 and filter frequency parameters, such as usage rate of each frequency, are set in step 43.

However, if the interfering frequency hopping network does not use all frequencies in the frequency range, the flow continues from step 45 directly to step 43, in which only the usage rate of the used frequencies are set in the frequency filter in the frequency matrix.

From step 43, the flow continues to step 36 in which the frequency matrix is updated based on the frequency filter parameters set in step 43. Thereafter, the flow continues to step 32 via step 37 as described above.

The updated frequency matrix is thereafter used to share available frequency resources. The filtered frequencies should be avoided and frequencies with less usage rate should be used if all frequencies within the frequency range are used by interfering networks.

It should be noted that certain modification of the flow in FIG. 3 could be modified without departing from the inventive concept. For instance, it is possible to have a continuous frequency scanning process, wherein a detected interfering communication signal within the frequency range immediately is recognized and the process of detecting the type of interfering network (step 38) is initiated while the scanning process continues.

Furthermore, the flow in FIG. 3 could also be modified to identify several types of interfering networks, such as a stationary network and a non-stationary network in parallel, before the frequency matrix is updated.

FIG. 4 shows an example of how a detected stationary wireless network influences the established frequency matrix.

Continuous interference 50 is found in a 16 MHz range and the network type is stationary, as described in more detail above. Since the interference is found to be in a frequency interval with a bandwidth of 16 MHz and every discrete frequency is detected to be of the same amplitude, the behaviour of the signal is recognized as a 64QAM OFDM which is used by 802.11g WiFi networks.

This type of interfering stationary network is typically stored in the database and used when setting the frequency filter parameters in step 43 (FIG. 3). In order to identify the type of stationary network the following parameters may be stored to recognise the behaviour: number of discrete frequencies detected within a bandwidth, dwell time, energy spread within the bandwidth, and other commonly know communication parameters.

An 802.11 signal is of OFDM type and consist of fifty two orthogonal subcarriers, each having a carrier frequency, and can be visualized as indicated by 50 in FIG. 4 and the subcarriers will cover a frequency interval 51 of 16 MHz. A dash/dot line 52 indicates the centre frequency CF of the frequency interval 51.

Previous experience has shown that not only the frequencies within the frequency interval 51 need to be avoided, as indicated by −n and +n on the frequency axis. A few additional frequencies on each side of the frequency interval 51 need to be avoided as well. The main task for the frequency filter is to define the frequency interval which should be avoided and a severity level of each individual frequency.

For instance the frequencies covered by the 802.11g subcarriers above will have a severity grade SG of:

$$SG=1*\alpha,$$

wherein $\alpha$ is a severity index as illustrated by the continuous line 53. At frequencies outside the centre frequency CF±n, the severity grade is zero.

The frequency filter is centred on line 52 of the OFDM signal 50 and the bandwidth of the filter is ±n. The filter may be implemented in software by a look-up table or using an algorithm as is obvious for a skilled person in the art.

Furthermore, the signal level of the interfering signal is preferably determined which is equal to a logical distance to the interfering network. However, the logical distance is not the same as the actual physical distance because a detected signal level is decreased by solid objects and reflections on surfaces.

The rule of thumb is: the lower signal level value the lower the risk of interfering with the detected signal. The signal level is stored in a table for further use. Signal level SL may be measured using know art such as RSSI circuitry and such.

The knowledge of the frequency filter, i.e. the filter parameters stored in the frequency matrix, and the signal level for each frequency makes it possible to calculate a quarantine time $t_q$ for every frequency subject to interference:

$$t_q(f)=SG(f)*SL(f)_1$$

wherein $t_q(f)$ is the quarantine time for a given frequency f, SG(t) is the severity grade for the given frequency f, and SL(F) is the signal level for the given frequency f. SG(f) may be considered as a frequency filter.

The quarantine time will determine the time a specific frequency should be avoided after it has been detected, i.e. a time delay before the frequency may be used for communication over the network. If interference is detected during the quarantine time, an updated quarantine time will be recalculated.

An interfering signal that is hopping in frequency is treated in another way. The majority of frequency hopping signals use the entire band and the least interfered frequencies will therefore be used. Even though a frequency hopping interfering signal is transmitted at the same power level from the interfering device the local environment will cause the signal level to vary at the signal detector. Solid objects will for instance decrease the signal level depending on the frequency it is transmitted on.

Figure 5:
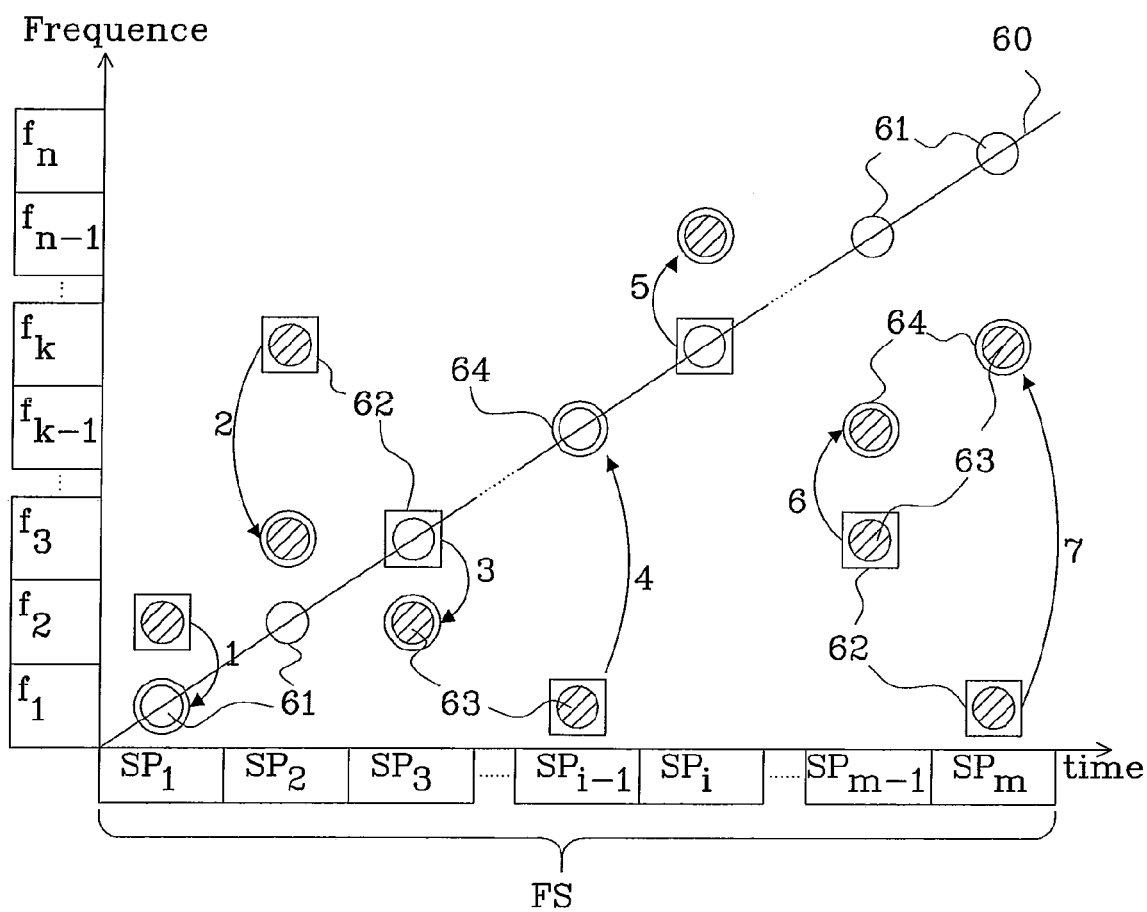
FIG. 5 shows an example of a frequency sequence as a function of available frequency channels.

FIG. 5 shows an example of a frequency sequence "FS" as a function of available frequency channels. The frequency sequence is divided into a plurality of sequence positions "$SP_i$ along the x-axis, in this embodiment exemplified as m sequence positions ($SP_1$-$SP_m$). Every sequence position SP has a predetermined duration in time i.e. a time when a frequency channel is used. The frequency sequence is preferably equal to what is considered a traditional time slot, and each sequence position is thus less than a traditional time slot.

The Y-axis represents the available frequency channels "$f_k$", in this embodiment exemplified as n frequency channels ($f_1$-$f_n$). Preferably the number of sequence positions is the same as the number of available frequency channels, i.e. n=m.

The purpose of FIG. 5 is to illustrate how to distribute the use of a predetermined frequency range more evenly, in order to increase the communication density for networks using a shared medium. Default frequency channels (illustrated by a non-filled circle 61 along a line 60) are assigned to each frequency sequence $SP_1$-$SP_m$. If the number of sequence positions is less than the available frequency channels, i.e. m<n, not all available frequency channels will be assigned as default frequency channels during the FS, and on the other hand if the number of sequence positions is higher than the available frequency channels, i.e. m>n, some frequency channels will be used more than once as default frequency channels. Each frequency channel defines frequency parameters, i.e. a frequency interval, or one or more carrier frequencies.

It should be noted that the default frequency channels do not have to be arranged along a line 60 as illustrated in FIG. 5, any suitable arrangement that distribute the frequency channels over the FS will be sufficient.

In order to illustrate the process of distributing the use of available frequencies within the frequency range, a set of rules are described below, and squares 62 indicate the frequency channel used during the previous FS for each $SP_i$, e.g. frequency channel $f_5$ was used for $SP_2$ during the previous FS. Further, shaded circles 63 indicate non-default frequency channels used to illustrate the rules and a circle 64 with a larger diameter indicates the frequency channel selected to be used for each SP during the current FS.

When all available frequency channels have been used frequency channel $f_1$ will then be used again in the following frequency sequence FS.

The rules apply in the following prioritized order for each sequence position $SP_i$:

Rule 1 (Denoted by "1" in FIG. 5)

If the default frequency channel becomes good (i.e. the identified interfering frequencies are non-overlapping with the frequency parameters of the default frequency channel and thus may be used for communication within the network), the default frequency channel 61 should be used in the current FS, as indicated by the circle 64, instead of the non-default frequency channel 63 used in the previous FS, as indicated by the square 62.

On the other hand if the default frequency channel still is bad (i.e. the identified interfering frequencies are still overlapping with the frequency parameters of the default frequency channel and thus should not be used for communication within the network), and the non-default frequency channel 63 used in the previous FS, as indicated by the square 62 remains "good", the non-default frequency channel should be used in the current FS.

Rule 2 (Denoted by "2" in FIG. 5)

If the default frequency channel 61 is bad (i.e. the identified interfering frequencies are overlapping with the frequency parameter of the default frequency channel and thus should not be used for communication within the network) and the first non-default frequency channel 63 used during the previous FS, as indicated by the square 62, also becomes bad, a second non-default channel 63 which is good (i.e. the identified interfering frequencies are non-overlapping with the frequency parameter of the second non-default frequency channel and thus may be used for communication within the network) should be used instead, as indicated by the circle 64.

Rule 3 (Denoted by "3" in FIG. 5)

If a default frequency channel 61 used during the previous FS, as indicated by the square 62, becomes bad (i.e. the identified interfering frequencies are overlapping with the frequency parameter of the default frequency channel and thus should not be used for communication within the network), a non-default frequency channel 63 which is good should be used instead, as indicated by the circle 64, as long as a minimum number of frequencies channels are used.

A system requirement may indicate that a minimum number, or percentage, of available frequency channels should be used during a FS. For instance, if 83 frequency channels are available, the minimum number of frequency channels used during a FS may be set to 22, which is approximately 26.5% of the available frequency channels. If a percentage is used, an appropriate percentage may be above 25%.

If the number of currently used frequency channels (indicated by the circle 64) for the complete FS is equal to the minimum number that the system is allowed to use, and there is a default frequency channel 61 currently not used within the FS that would be more appropriate to use than another already used default frequency channel, then the more appropriate default frequency channel is restored in use. (After this, rule 3 will apply to the other, less appropriate default frequency channels.)

Rule 4 (Denoted by "4" in FIG. 5)

If a default frequency channel 61 is equally bad as a non-default frequency channel 63 used during the previous FS, as indicated by the square 62, the default frequency channel 61 is used instead, as indicated by the circle 64.

Rule 5 (Denoted by "5" in FIG. 5)

If a default frequency channel 61 used in the previous FS, as indicated by the square 62, is worse (i.e. less appropriate to use) than a non-default frequency channel 63, the non-default frequency channel is used instead, as indicated by the circle 64. This may be the case when a default frequency channel is positioned within a frequency range 51 occupied by a stationary network as illustrated in FIG. 4, and the non-default frequency channel is positioned within the bandwidth of the filter (±n) but outside the frequency range 51 where the severity grade is lower than for the default frequency channel.

Rule 6 (Denoted by "6" in FIG. 5)

If a second non-default frequency channel 63 is better (i.e. more appropriate to use) than a first non-default frequency channel 63 used during the previous FS, as indicated by the square 62, the more appropriate second non-default frequency channel 63 is used instead, as indicated by the circle 64.

Rule 7 (Denoted by "7" in FIG. 5)

If a second non-default frequency channel 63 is equally good (i.e. may be used for communication within the network) as a first non-default frequency channel 63 used during the previous FS, as indicated by the square 62, the non-default frequency channel 63 that levels out used frequency channels, in this example the second non-default frequency channel 63, is selected instead, as indicated by the circle 64. I.e. good non-default frequency channels are levelled out. The aim is to have an even density distribution between good non-default frequency channels.

By assigning a frequency channel $f_k$ to each position $SP_i$ within the sequence FS based on the identified interfering frequencies (i.e. using available frequency channels that are "good" and reducing the use of frequency channels that are "bad"), the use of interfering frequencies is avoided, or at least limited.

It should be noted that the term "frequency channel" should not be limited to only cover a frequency interval. Each frequency channel should be interpreted to define predetermined frequency parameters, such as a frequency interval, a single carrier frequency, or a number of carrier frequencies.

As a general principle, the default frequency channel, which defines default frequency parameters (such as a default frequency range or one or more default carrier frequencies), is normally assigned to a sequence position SP if the identified interfering frequencies within the frequency range are non-overlapping with the default frequency parameters, i.e. the default frequency channel is "good". On the other hand if the identified interfering frequencies within the frequency range are overlapping with the default frequency parameters, the default frequency channel is "bad", and it might be better to assign a non-default frequency channel instead of the default frequency channel.

The frequency matrix used to select the frequency channels for each sequence position have to updated regularly, preferably before the frequency channels for a new frequency sequence is selected.

Figure 6:
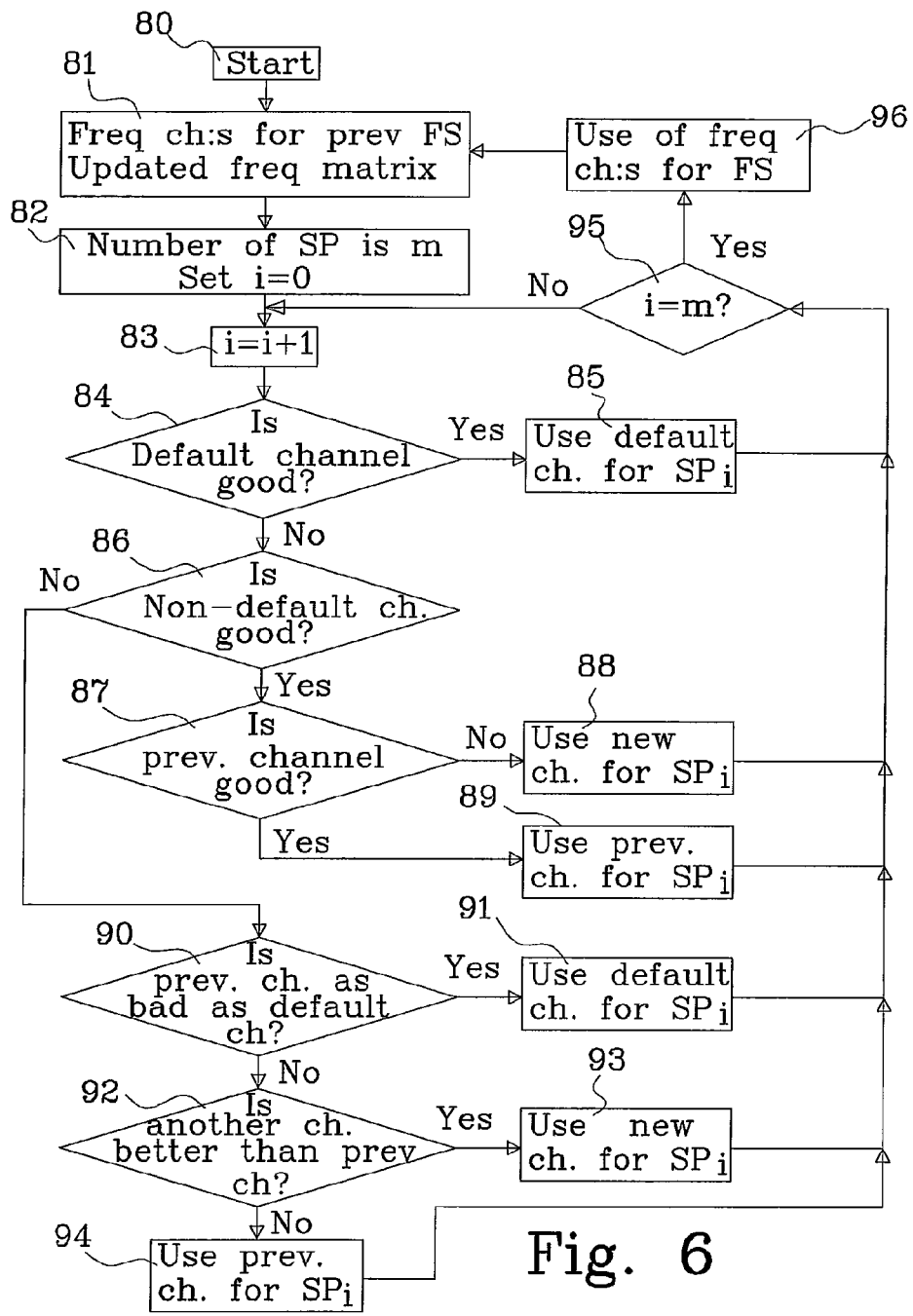
FIG. 6 shows a flow chart of a method for assigning frequency channels to positions in a frequency sequence.

FIG. 6 shows a flow chart illustrating the rules described above. The flow starts in step 80, and in step 81 the frequency channels used in each respective position $SP_i$ in the previous frequency sequence FS is made available to the system together with an updated version of the frequency matrix, see description in connection with FIG. 3.

The number of sequence positions SP is set to "m", and an integer i is set to zero (i=0) in step 82. In step 83, the integer "i" is increased by one and information about the default frequency channel used for $SP_1$ is retrieved from the frequency matrix in step 84. If the default frequency channel for $SP_1$ is good, the flow continues to step 85 in which the default frequency channel is selected to be used for the first position $SP_1$ in the current frequency sequence. On the other hand if the default frequency channel for $SP_1$ is not good, i.e. bad, the flow continues to step 86. This corresponds to the first part of Rule 1 described above.

In step 86, information regarding non-default frequency channels is retrieved from the updated frequency matrix. If the frequency matrix indicates that any non-default frequency channel is "good", then the flow continues to step 87. On the other hand if no "good" non-default frequency channels are available within the frequency range, the flow continues to step 90.

In step 87, information regarding the frequency channel used in the previous frequency sequence (i.e. a first non-default frequency channel) is retrieved and if the frequency matrix indicates that the first frequency channel is good, the flow continues to step 89, in which the first non-default frequency channel is selected to be used for the first position $SP_1$ in the current frequency sequence. This corresponds to the second part of Rule 1 described above.

On the other hand if the first non-default frequency channel for $SP_1$ is not good, i.e. bad, the flow continues to step 88, in which a new "second" non-default frequency channel is selected to be used for the first position $SP_1$ in the current frequency sequence. On the other hand if all frequency channels are "bad", the flow continues to step 90. This corresponds to Rule 2 above.

In step 90, the information regarding the first non-default channel (used on the previous FS for the first position $SP_1$) and the default frequency channel are compared, and if they are equally bad, the flow continues to step 91 in which the default frequency channel is selected to be used for the first position $SP_1$ in the current frequency sequence. On the other hand if the first non-default frequency channel is "better" than the default frequency channel, the flow continues to step 92. This corresponds to Rule 4 above.

In step 92, the information regarding the first non-default channel (used on the previous FS for the first position $SP_1$) and other non-default frequency channels are compared, and if another non-default frequency channel is "better" than the first non-default frequency channel, the flow continues to step 93 in which a new "second" non-default frequency channel is selected to be used for the first position $SP_1$ in the current frequency sequence. On the other hand if the first non-default frequency channel is "better" than the default frequency channel, the flow continues to step 94, in which a first non-default frequency channel is selected to be used for the first position $SP_1$ in the current frequency sequence. This corresponds to Rules 5 and 6 above.

From steps 85, 88, 89, 91, 93 and 94, the flow continues to step 95, in which the integer "i" is compared with "m" and the flow is fed back to step 83 if the integer "i" is less than "m" (i<m) and steps 83-94 are repeated until all sequence positions have been assigned a frequency channel to be used during the current FS.

When "i" is equal to "m", the flow continues to step 96, in which the functionality of Rule 3 is implemented, i.e. making sure that a minimum number of available frequency channels are used, preferably more than 25% of the available frequency channels within the frequency range. Furthermore, the functionality of Rule 7 is also implemented to ensure an even density distribution between "good" non-default frequency channels is achieved over time. The flow then continues to step 81, in which the current FS becomes the previous FS and the frequency matrix is updated.

Figure 7:
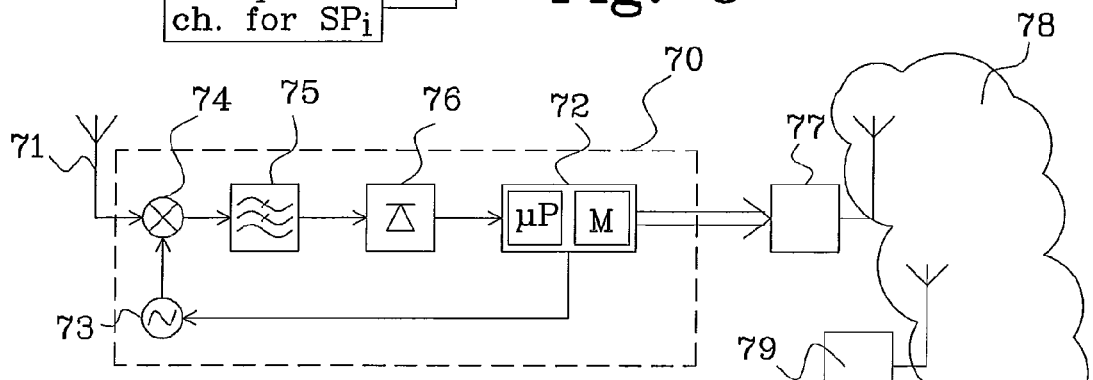
FIG. 7 shows an apparatus adapted to detect and identify interfering networks, as well as establish the frequency matrix used when assigning frequency channels for communication.

FIG. 7 shows an apparatus 70 which is provided with means to detect and to identify interfering networks as described in connection with FIG. 3

The apparatus 70 is mainly needed to convert a high frequency signal received by an antenna 71 to a signal which is recognizable to a control unit 72 having a processor μP and a memory M. The method described in FIG. 3 is implemented within the control unit 72, which is configured to scan a frequency range by controlling the tuning frequency of an oscillator 73, connected to a down converter 74, and thus selects which frequency that should be monitored. The down converted signal is forwarded to a detector 76 via a low-pass filter 75, and the control unit 72 receives signals from the detector 76 in order to scan each frequency within the frequency range.

The control unit 72 also is configured to calculate and store information regarding interfering frequencies, i.e. the content of the frequency matrix, which is used to determine an appropriate sharing of frequency resources.

The apparatus 70 is preferably integrated as a part in a network controller 77 for radio frequency communication in a wireless network 78, whereby information regarding suitable frequencies to use for communication purposes with a communication device 79 within the network may be provided. The invention as described in connection with FIGS. 2-5 is preferably realised as software stored in the memory M within the control unit 72.

Alternative embodiment of the apparatus may exist that mainly depends on the type of signal used in the network.

The invention will provide a network that more efficient use of available frequency resources, which is used by frequency based communication systems. Furthermore, lower energy consumption is achieved due to reduced number of retransmissions of lost packets due to interference.

Additionally, data throughput in the network is increased, which may be used in two ways:
 a. High data rate equipment could be modified to have an increased data throughput.
 b. Less expensive equipment with a lower data rate could be used, which throughput may be increased to a level equivalent to a high data rate equipment.

Even if only one network is using the invention in an area where a plurality of networks is communicating, all networks within that area will benefit from the mentioned advantages above.

ABBREVIATIONS

CF Centre Frequency
FS Frequency Sequence
GSM Global System for Mobile communication
MHz Mega Hertz
OFDM Orthogonal Frequency Division Multiplexing
SG Severity Grade
SL Signal Level
SP Sequence Position
WiFi Wireless Fidelity
QAM Quadrature Amplitude Modulation

REFERENCES

[1] WO 2007/009043 A1 with the title "Wireless communications approach using background monitoring", by Skafidas et al.
[2] Article with the title "Interference Mitigation Using Spectrum Sensing" by Srikantewara, 5, and Maciocco, C., Computer Communications and Networks, 2007 IEEE, pp 39-44.

The invention claimed is:

1. A method for selecting operating frequency channels for a network communicating data over a shared medium, the network being configured to communicate within a frequency range, the method comprising:
 i) dividing the frequency range into a plurality of frequency channels ($f_1$-$f_n$), each frequency channel defining predetermined frequency parameters;
 ii) dividing data to be communicated over the network into sequences (FS), each sequence having a plurality of positions ($SP_1$-$SP_m$);
 iii) regularly scanning the frequency range to identify interfering frequencies within the frequency range generated by interfering networks operating within the shared medium;
 iv) assigning a frequency channel ($f_k$) to each position ($SP_i$) within a current sequence based on the interfering frequencies identified in step iii), whereby the use of interfering frequencies is limited;
 defining a default frequency channel, having default frequency parameters, for each position ($SP_i$) in the current sequence;
 v) primarily selecting the frequency channel ($f_k$) assigned to the position ($SP_i$) in the current sequence in step iv) to be the default frequency channel, if the identified interfering frequencies in step iii) are non-overlapping with the default frequency parameters; and
 vi) secondarily selecting the frequency channel ($f_k$) assigned to the position ($SP_i$) in the current sequence in step iv) to be a non-default frequency channel if the identified interfering frequencies in step iii) are non-overlapping with the frequency parameters of the non-default frequency channel.

2. The method according to claim 1, further comprising:
 generating a frequency matrix used to store frequency information of the interfering frequencies identified in step iii) within the frequency range; and
 regularly updating a content of the frequency matrix, whereby the frequency channel ($f_k$) assigned in step iv) is based on the frequency information stored in the frequency matrix.

3. The method according to claim 2, further comprising:
 generating a quarantine time for each identified interfering frequency, the quarantine time defining a time delay before the frequency is used for communication over the network; and
 storing the quarantine time in the frequency matrix whereby the frequency channel assigned in step iv) further is based on the quarantine time stored in the frequency matrix.

4. The method according to claim 3, wherein the step iii) further comprises detecting a type of interfering network, and the quarantine time is selected to be: zero if the type of interfering network is a frequency hopping network, whereby no time delay is generated and stored in the frequency matrix, or a positive number if the type of interfering network is a frequency stationary network, whereby a time delay is generated and stored in the frequency matrix.

5. The method according to claim 4, wherein the method further comprises identifying the type of frequency stationary network, and selecting the quarantine time based on the type of frequency stationary network.

6. The method according to claim 1, wherein the plurality of frequency channels and the plurality of positions in each sequence are the same.

7. The method according to claim 1, wherein the frequency channel used for the position ($SP_i$) in a previous sequence was a first non-default frequency channel, and step vi) further comprises: selecting the non-default frequency channel to be the first non-default frequency channel if the identified interfering frequencies in step iii) are non-overlapping with the frequency parameters of the first non-default frequency channel, or selecting the non-default frequency channel to be a second frequency channel if the identified interfering frequencies in step iii) are overlapping with the frequency parameters of the first non-default frequency channel.

8. The method according claim 7, further comprising:
 vii) thirdly selecting the frequency channel ($f_k$) assigned to the position ($SP_i$) in the current sequence in step iv) to be any from the group of the default frequency channel, the first non-default frequency channel, or a second non-default frequency channel, if the identified interfering frequencies in step iii) are overlapping with the plurality of frequency channels in the frequency range.

9. The method according to claim 1, wherein the default frequency channel of each position within a sequence are different from each other.

10. The method according to claim 1, further comprising: selecting the frequency parameters to define a frequency interval or at least one carrier frequency.

11. The method according to claim 1, wherein the network is selected to be a wireless network having a coverage area.

12. An apparatus for detecting and identifying interfering networks, the apparatus comprising: an antenna to receive signals within a frequency range; a control unit configured to scan the frequencies within the frequency range; and a detector configured to detect interfering networks operating on one or more frequencies within the frequency range; wherein the control unit is further configured to receive information from the detector regarding interfering networks and to perform the method according to claim 1.

13. Software embodied in a non-transitory computer readable medium comprising instructions executable by a processor to perform the method according to claim 1.

14. A network adapted to communicate using radio frequency communication, the network comprising: a network controller configured to communicate with at least one communicating device within a frequency range; wherein the network controller includes an apparatus according to claim 12.

\* \* \* \* \*

UNITED STATES PATENT AND TRADEMARK OFFICE
Certificate

Patent No. 8,457,023 B2

Patented: June 4, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Niclas Norlén, Uddevalla (SE); Per Hulthén, Göteborg (SE); Michael Karlsson, Kode (SE); and Lennart Floreby, Ljungskile (SE).

Signed and Sealed this Third Day of September 2013.

KWANG B. YAO
*Supervisory Patent Examiner*
Art Unit 2473
Technology Center 2400